UNITED STATES PATENT OFFICE.

EMIL HAUSSMANN, OF BERLIN, GERMANY, ASSIGNOR TO THE ACTIEN-GESELLSCHAFT FÜR ANILIN FABRIKATION, OF SAME PLACE.

PROCESS OF DYEING.

SPECIFICATION forming part of Letters Patent No. 665,737, dated January 8, 1901.

Application filed July 10, 1900. Serial No. 23,067. (No specimens.)

*To all whom it may concern:*

Be it known that I, EMIL HAUSSMANN, of Berlin, in the Kingdom of Prussia, German Empire, have invented new and useful Improvements in Processes of Dyeing and Printing; and I do hereby declare that the following is a full, clear, and exact description of the invention, which will enable others skilled in the art to which it appertains to make and use the same.

The application in industry of sulfureted coloring-matters directly dyeing cotton has essentially increased during late years; but the presence of sodium sulfid employed as a solvent offers certain great inconveniences, as it is most injurious to the hands of the workmen. It prevents the use of metallic vessels, it yields waste waters containing sulfur, and it affects, moreover, the fiber to a considerable extent.

I have now found that the above inconveniences may easily be avoided by simply dissolving the sulfureted coloring-matters in caustic-soda lye with the addition of certain organic substances possessing weakly-reducing properties.

The following example may illustrate my invention: One part, by weight, of immedial-black is ground with one part of caustic-soda lye (40° Baumé specific gravity) and one part of boiling water. One part of glucose is added thereto, and the mixture is gently heated until a clear greenish-black liquid is formed. The standard solution thus obtained is ready for dyeing processes. A sufficient quantity of it is added to the dye-bath, and dyeing is effected, boiling, if necessary, with addition of common salt or normal sodium sulfite. The goods are rinsed and dried.

The general character of my invention is not altered by substituting in the aforesaid example for glucose other equivalent substances susceptible to act in the presence of caustic-soda lye as weakly-reduced agents—for instance, lactic acid, dextrine, milk-sugar, or the like.

This new process may be applied with an analogous result for other sulfureted dyestuffs—for instance, for immedial-blue, immedial-bronze, vidal-black, thiocatechin, thiogen-black, sulfanilin-black, sulfone-black, sulfogen-black, katigen-black, katigen-brown, katigen-olive, verde-italiano, cross-dye black, eclipse-black, sulfur-black, and the like.

This new method offers another great technical advantage, as it allows sulfureted dyestuffs to be employed in printing processes, from which on account of sodium sulfid corroding the metallic parts of the printing apparatus they have hitherto been excluded.

For printing purposes the standard solution is to be thickened by means of British gum or other suitable additions.

Having now described my invention, and in what manner the same is to be performed, what I claim as new is—

The herein-described process of dyeing and printing with sulfureted coloring-matters, which consists in dissolving these coloring-matters in caustic alkalies with the addition of glucose and then dyeing the goods with the solutions thus obtained.

In witness whereof I have hereunto signed my name, this 23d day of June, 1900, in the presence of two subscribing witnesses.

EMIL HAUSSMANN.

Witnesses:
 HENRY HASPER,
 WOLDEMAR HAUPT.